United States Patent [19]

Okumura et al.

[11] Patent Number: 4,859,039

[45] Date of Patent: Aug. 22, 1989

[54] LIGHT-POLARIZING FILM

[75] Inventors: Takuzo Okumura, Tokyo; Toyokazu Okada; Hitoshi Kikui, both of Osaka, all of Japan

[73] Assignee: Sumitomo Chemical Company, Limited, Osaka, Japan

[21] Appl. No.: 797,024

[22] Filed: Nov. 12, 1985

[30] Foreign Application Priority Data

Nov. 16, 1984 [JP] Japan ................................ 59-243084
Aug. 6, 1985 [JP] Japan ................................ 60-173916

[51] Int. Cl.$^4$ ........................ G02B 5/30; B05D 5/06; D06N 7/06
[52] U.S. Cl. .................................. 350/398; 427/163; 428/543
[58] Field of Search ...................... 350/398; 427/163; 428/543

[56] References Cited

U.S. PATENT DOCUMENTS

| | | | |
|---|---|---|---|
| 2,236,972 | 4/1941 | Käsemann | 350/398 X |
| 2,246,087 | 6/1941 | Bailey et al. | 350/398 |
| 2,346,766 | 4/1944 | Land | 350/398 |
| 2,454,515 | 11/1948 | Land | 350/398 |
| 4,268,127 | 5/1981 | Oshima et al. | 350/398 X |
| 4,387,133 | 6/1983 | Ichikawa et al. | 350/370 X |

FOREIGN PATENT DOCUMENTS

| | | |
|---|---|---|
| 198034 | 6/1958 | Austria . |
| 966421 | 8/1957 | Fed. Rep. of Germany . |
| 3129162 | 3/1982 | Fed. Rep. of Germany . |
| 3148787 | 7/1983 | Fed. Rep. of Germany . |
| 1070525 | 2/1954 | France . |
| 1155112 | 11/1957 | France . |
| 55-90926 | 7/1980 | Japan . |
| 60-66204 | 4/1985 | Japan ................................ 350/398 |
| 2055625 | 3/1981 | United Kingdom . |

Primary Examiner—John K. Corbin
Assistant Examiner—David J. Edmondson
Attorney, Agent, or Firm—Cushman, Darby & Cushman

[57] ABSTRACT

Highly durable, light-polarizing film having neutral gray as well as high polarizing coefficient is provided. The film comprises a uniaxially stretched base polymer film of, for example, polyvinyl alcohol or derivatives thereof and at least two dichroism dyes adsorbed and orientated therein. The dichroism dyes are, for example, C.I. DIrect Yellow 12, C.I. Direct Black 17 and C.I. Direct Blue 202. The film is usable for display by liquid crystal. A boric-acid treatment is used to improve the polarization properties.

7 Claims, 6 Drawing Sheets

FIG. 11
COMPARISON EXAMPLE #1

FIG. 12
COMPARISON EXAMPLE #2

LIGHT-POLARIZING FILM

This invention relates to a highly durable, dye light-polarizing film having neutral gray and a high polarizing coefficient, which comprises a polymer film having at least two dichroism dyes adsorbed and oriented therein.

Hitherto, a light-polarizing film has generally been prepared by adsorbing such polarizing elements as iodine or dichroism dye in a stretch-oriented base film. The base film is made from polyvinyl alcohol or derivatives thereof. Alternatively, the film is made from polyene prepared by the dehydrochlorination of polyvinyl chloride or dehydration of polyvinyl alcohol.

A light-polarizing film in which a polarizing element of iodine is used is excellent in the initial polarization quality, but is not satisfactory in durability, particularly when employed over a long period of time under high temperature and high humidity conditions, since water and heat resistance are minimal. A few proposals have been made, in order to improve durability, e.g., a rapid treatment with aqueous formalin or boric acid solution or application of a protective film made from polymer film having low water vapor transmission. However, these treatments are not yet sufficient to improve resistance under high temperature and humidity conditions.

A light-polarizing film in which a polarizing element of dichroism dye is used is superior to that in which iodine is used in place of the dichroism dye, with respect to durability with respect to water and heat. However, there are still problems of (1) no definite light transmission or not neutral gray, (2) no definite polarizing coefficient and (3) a considerably inferior polarizing coefficient to that of a light polarizing film in which iodine is used.

After our extensive studies on these problems, we have succeeded in finding that adsorbing and oriented specific organic direct dyes in a hydrophilic polymer film provides a highly durable dye light-polarizing film having a neutral gray and a high polarizing coefficient.

In the accompanying drawings.

The present invention provides a highly durable dye light-polarizing film having neutral gray and a high polarizing coefficient in which a hydrophilic polymer film has a polarizing element of specific organic direct dye adsorbed and oriented therein. The present film is featured in that the minimum polarizing coefficient is at least 70% and difference between the minimum and maximum light transmittances is at most 20%, over the visible light wavelength region of 400–700 nm.

Furthermore, according to the present invention, a dye, light-polarizing film of high quality can be provided, in which, over the visible light wavelength region of 400–700 nm, difference between the maximum and minimum polarizing coefficients is at most 20% and the minimum light transmittance is at least 20%.

The present light-polarizing film is prepared by adsorbing and oriented at least two, preferably, three or more dichroism dyes in a polymer film, said dyes having different adsorption wavelength region in the visible light region. In more concrete examples, the first approach is that a dye comprising at least one each from the following respective classes is adsorbed and oriented in a polymer film:
(A) yellow dichroism dye having a major absorption wavelength region in the range of 400–500 nm;
(B) black dichroism dye having a major absorption wavelength region in the range of 450–650 nm; and
(C) blue dichroism dye having major absorption wavelength region in the range of 570–700 nm.

The second approach is that a dye comprising at least one each from the following respective four classes, i.e., (A), (B), (C) above and (D) mentioned below, is adsorbed and oriented in a polymer film:
(D) orange or red dichroism dye having a major absorption wavelength region in the range of 450–570 nm.

The third approach is that a dye comprising at least one each from the following respective three classes, i.e., (A), (C) and (D) above, is adsorbed and oriented in a polymer film.

The fourth approach is that a dye comprising at least one each from the following respective three classes, i.e., (C), (D) above and (E) mentioned below, is adsorbed and oriented in a polymer film:
(E) green dichroism dye having a major absorption wavelength region in the range of 600–700 nm or 400–450 nm.

Any organic direct dyes may be employed in the present invention, as long as the dichroism ratio is large. The dyes are generally selected from azo dyes. Examples thereof are as follows, referring to C.I. Generic Names and trade names, too:

Organic direct dyes:
(A): yellow dichroism dyes having a major absorption wavelength region in the range of 400–500 nm (class A),
(B): black dichroism dyes having a major absorption wavelength region in the range of 450–650 nm (class B),
(C): blue dichroism dyes having a major absorption wavelength region in the range of 570–700 nm (class C),
(D): orange or red dichroism dyes having a major absorption wavelength region in the range of 450–570 nm (class D), and
(E): green dichroism dyes having a major absorption wavelength in the range of 600–700 nm or 400–450 nm (class E).

C.I. Generic names and trade names:
Class A:
C.I. Direct Yellow 12 [example of trade name (hereinafter the same): "Chrysophenine"]
C.I. Direct Yellow 44 ["Direct Fast Yellow GC"]
C.I. Direct Yellow 28 ["Sumilight Supra Yellow BC Conc"]
C.I. Direct Yellow 142 ["Sumilight Yellow GR"]
Class B:
C.I. Direct Black 17 ["Japanol Fast Black D Conc"]
C.I. Direct Black 19 ["Sumilight Black G Conc"]
C.I. Direct Black 51 ["Direct Fast Black Conc"]
C.I. Direct Black 154 ["Direct Deep Black XA"]
C.I. Direct Black 32 ["Direct Fast Black AB]"
C.I. Direct Black 22 ["Direct Fast Black B"]
C.I. Direct Black 112 ["Sumilight Supra Grey CGL"]
C.I. Direct Black 113 ["Sumilight Supra Grey NGL Conc"]
Class C:
C.I. Direct Blue 202 ["Sumilight Supra Blue 3GS"]
C.I. Direct Blue 1 ["Direct Sky Blue 6B"]
C.I. Direct Blue 168 ["Direct Copper Blue 2B"]

C.I. Direct Blue 71 ["Sumilight Blue BRR Conc"]
C.I. Direct Blue 78 ["Sumilight Supra Blue G Conc"]
Class D:
C.I. Direct Orange 26 ["Direct Fast Orange S"]
C.I. Direct Orange 107 ["Sumilight Supra Orange GD Extra Conc"]
C.I. Direct Red 31 ["Nippon Fast Red BB Conc"]
C.I. Direct Red 2 ["Benzopurpurine 4B"]
C.I. Direct Red 81 ["Sumilight Red 4B"]
C.I. Direct Red 79 ["Sumilight Supra Red 4BL 170%"]
C.I. Direct Red 247 ["Japanol Fast Red FA"]
Class E:
C.I. Direct Green 85 ["Direct Dark Green BA"]

A dye desirable for the present invention is one which satisfies the following requirements, over the whole visible light region of 400–700 nm; (1) the minimum polarizing coefficient is at least 70%, preferably at least 80%, (2) the difference between the maximum and minimum polarizing coefficients is at most 20%, and (3) the difference between the minimum and maximum light transmittances is at most 20%, preferably at most 15%. No polarization performances as above have ever been expected. The present dye is obtained by selecting at least one each from the respective five classes above, for instance, (1) a group consisting of classes A, B and C, (2) a group consisting of classes A, B, C and D, (3) a group consisting of classes A, C and D or (4) a group consisting of classes C, D and E.

Dyes listed in the examples above have large dichroism ratio, in particular, among organic direct dyes.

Groups mentioned above (1)–(4) are standard ones. Dyes belonging to the other classes may be incorporated thereinto.

Mixing various dyes is necessary, which respectively have different absorption and polarization characteristics at different wavelength regions within the range of 400–700 nm. One dye only is hardly able to provide a polarizing film, over the entire visible light region of 400–700 nm, showing the same absorption characteristics, i.e., neutral gray, and having a high polarizing coefficient. No. dye polarizing film is obtained without blending various dyes, which, over the whole wavelength region of visible light ranging from 400 to 700 nm, shows neutral gray and has a high polarizing coefficient.

One of combinations of dyes in more concrete manner suitable for the present invention is one comprising three dyes, i.e., C.I. Direct Yellow 12, C.I. Direct Black 19 and C.I. Direct Blue 202. Another example is a combination of four dyes, i.e., C.I. Direct Yellow 12, C.I. Direct Black 17, C.I. Direct Blue 202 and C.I. Direct Orange 26. A further example is a combination of five dyes, i.e., C.I. Direct Yellow 44, C.I. Direct Black 17, C.I. Direct Blue 202, C.I. Direct Orange 26 and C.I. Direct Red 2. The other example is a combination of four dyes, i.e., C.I. Direct Blue 1, C.I. Direct Red 81, C.I. Direct Orange 107 and C.I. Direct Green 85.

Further addition of dichroism dyes mentioned below is more favorable:
C.I. Direct Violet 9 [trade name (hereinafter the same) "Nippon Brilliant Violet BK Conc"]
C.I. Direct Violet 51 ["Sumilight Violet BB"]
C.I. Direct Brown 106 ["sumilight Supra Brown G Conc"]
C.I. Direct Brown 223 ["Direct Brown MA"]

The polymer film used in the present invention is made from polyvinyl alcohol or derivatives thereof. Alternatively, these compounds may be modified by olefins such as ethylene, propylene, etc., crotonic acid, acrylic acid, methacrylic acid, maleic acid, etc. Furthermore, ethylene-vinylacetate copolymer resin, saponified ethylene-vinylacetate copolymer resin, nylon resin or polyester resin may be used. Polyvinyl alcohol or derivatives thereof are preferred, since a dye is easily adsorbed and oriented in the film.

One of processes to have organic direct dyes adsorbed and orientated in polymer film is usually to dissolve the organic direct dyes in water and then to dye the polymer film therewith. Orientation of the dichroism dye adsorbed in the polymer film is effected by orienting the polymer film before or after the adsorption. Stretching a film made from polyvinyl alcohol or derivatives thereof is carried out by a wet stretching method or by a dry stretching method under rolling. The latter method is preferably from the viewpoint of stability in working and uniformity in stretching.

Dry stretching under rolling of a film made of polyvinyl alcohol or derivatives thereof is carried out in such a manner that the percentage of water content of film is controlled to 8% or less, back tension of at least 50 Kg/cm$^2$ is applied and then rolling is effected under at least 100 Kg/cm of line pressure by means of at least one pair of rolls held at a temperature of 20° C. or higher, preferably 55° C.–130° C. Then, oriented film made from polyvinyl alcohol or derivatives thereof is obtained with high stretching ratio and without unevenness in stretching.

After the organic direct dye is adsorbed and oriented in polymer film, the film is, if necessary, subjected to an after-treatment with, for example, aqueous boric acid solution. Light transmittance of a light-polarizing film as well as polarizing co-efficient thereof are improved thereby. The after-treatment with aqueous boric acid solution varies depending on the polymer film and the organic direct dye employed. It is usually conducted under the conditions wherein the concentration of boric acid is 1–15%, preferably 5–10%, and a temperature is 30°–80° C., preferably 50°–80° C. When the concentration of boric acid is less than 1% and temperature is lower than 30° C., an improvement desired is hardly obtained. On the other hand, when the concentration of boric acid is greater than 15% and the temperature is higher than 80° C., the light-polarizing film obtained is brittle. Addition of surface active agents with or without inorganic salts to the boric acid solution is preferred. Any nonionic, cationic or anionic surface active agents may be employed, preferably nonionic ones. a nonionic surface active agent is, for example, ethylene oxide-addition polymerization products of higher alcohol or ethylene oxide-addition polymerization products of nonyl phenol. The amount of the surface active agent to be added is 0.005–0.5 wt.%, preferably 0.02–0.2 wt.% based on water. Anhydrous sodium sulfate is usually employed as the inorganic salt. Alternatively, a sodium or potassium salt of sulfuric acid, hydrochloric acid or nitric acid may be used. These inorganic salts may be used in an amount of 0.1–5 wt.%, preferably 0.3–3 wt.%. If desired, a fixation treatment may be effected together with an aqueous cationic high molecular compound solution.

Either one or both surfaces of the present dye light-polarizing film thus obtained may be coated with a protector film uniaxially stretch-oriented. The protector film is made from a material superior in optical transparency and mechanical strength. The material, is for example, tetrafluoroethylene-hexafluoroethylene copolymer and other fluorocarbon resin, polyester resin, polyolefin resin, polyamide resin, etc., in addition to conventional cellulose acetate and polyacrylic resin.

The present dye light-polarizing film has extremely small differences between the maximum and minimum light transmittances over the whole visible light region of 400-700 nm than that of any conventional ones. The present film has neutral gray. Furthermore, the present film has small differences between the maximum and minimum polarizing coefficients over the whole visible light region. Polarization quality of the present film is excellent and on the same level as that of a light-polarizing film wherein a light polarizing element is iodine.

The present light-polarizing film is usable for display by liquid crystal, particularly for such applications as instruments mounted in vehicles and displays in various industrial instruments, which require high durability.

The present invention is explained in more detail by example.

The polarizing coefficient referred to in the present invention is defined as follows. Two sample sheets of polarizing film or polarizing plates are piled one on the other and subjected to measurement of a light transmission curve. The spectrophotometer UV-210 by Shimadzu Seisakusho was used. The polarizing coefficient is given by the formula $$\sqrt{\frac{H_\parallel - H_\perp}{H_\parallel + H_\perp}} \times 100 \ (\%)$$

wherein $H_\parallel$ denotes the light transmission in placing two identical polarizers in parallel which is measured when two sample sheets are piled so that the directions of stretch-orientation of the light polarizing film are parallel to each, and $H_\perp$ denotes the light transmission in placing two identical polarizers on cross axis (0° and 90°) which is measured when two sample sheets are piled so that the directions of stretch-orientation of the light-polarizing film are cross each other.

EXAMPLE 1

Figure 1:
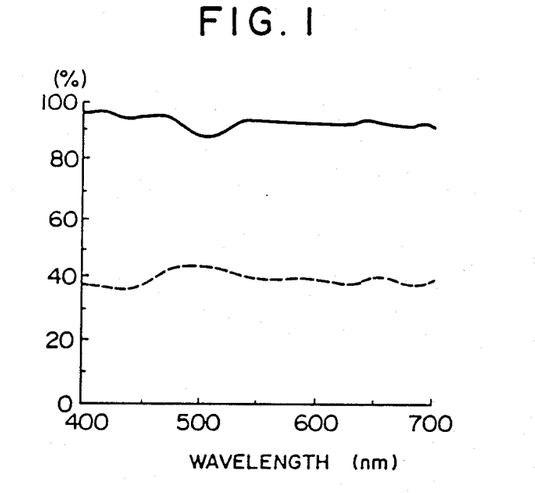
FIGS. 1–10 show the relationship between wavelength, light transmittance of a single polarizer and the polarizing coefficient with respect to the light-polarizing films obtained in Examples 1–10.

A polyvinyl alcohol film (Kuraray Vinylon ® 7500) of 75 microns thick was stretched four times at 105° C. by means of pressure rolls uniaxially in the longitudinal direction, to prepare a light-polarizing base film. The film was dipped at 60° C. for ten minutes, under tension, in a solution containing three dyes defined below and 7.0 wt.% of anhydrous sodium sulfate: 0.08 wt.%, 0.06 wt.% and 2.5 wt.% of "Japanol Fast Black D conc" of C.I. Direct Black 17 in C.I. Generic Name (same hereinafter), "Chrysophenine" of C.I. Direct Yellow 12 and "Sumilight Supra Blue 3 GS" of C.I. Direct Blue 202, respectively, all being manufactured by Sumitomo Chemical Company, Limited. Then, the film was washed for 30 minutes with water of 20° C. to obtain a light-polarizing film which had neutral gray. FIG. 1 shows light transmittance of a single polarizer and polarizing coefficient thereof in dotted and solid lines, respectively.

EXAMPLE 2

Figure 2:
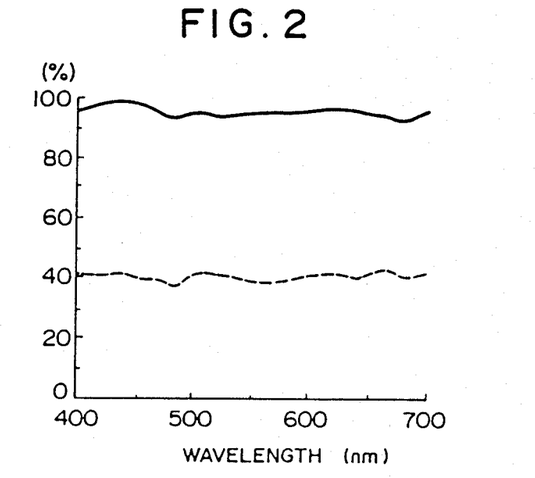

A similar base film so that in Example 1 was dipped at 60° C. for ten minutes, under tension, in a solution containing four dyes defined below and 7 wt.%, of anhydrous sodium sulfate: 0.06 wt%, 0.10 wt.%, 0.08 wt.% and 2.5 wt.% of "Chrysophenine", "Direct Fast Orange S" of C.I. Direct Orange 26, "Japanol Fast Black D conc" and "Sumilight Supra Blue 3 GS", respectively, all being manufactured by Sumitomo Chemical Company, Limited. Then, the film was further dipped at 65° C. for five minutes in aqueous solution of 7.5 wt.% boric acid, and washed for 30 minutes with water of 20° C. The light-polarizing film thus obtained had neutral gray. FIG. 2 shows the light transmittance of a single polarizer and polarizing coefficient thereof in dotted and solid lines, respectively.

EXAMPLE 3

Figure 3:
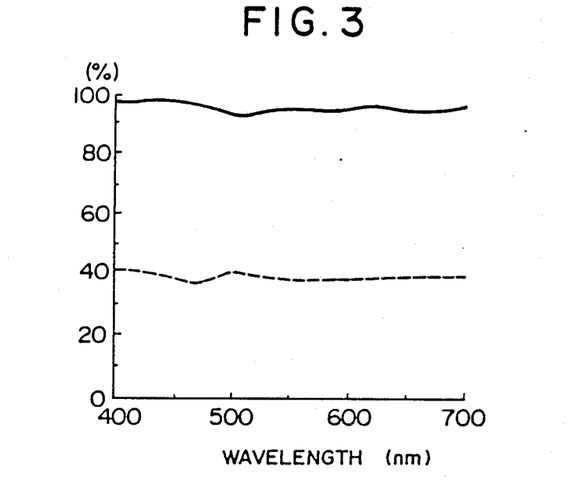

A similar base film to that in Example 1 was dipped at 60° C. for ten minutes, under tension, in a solution containing five dyes defined below and 7.0 wt.% of anhydrous sodium sulfate: 0.06 wt.%, 0.08 wt.%, 0.10 wt.%, 0.10 wt.% and 2.0 wt.% of "Chrysophenine", "Japanol Fast Black.D conc", "Direct Fast Orange S", "Benzopurpurine 4 B" of C.I. Direct Red 2 and "Sumilight Supra Blue 3 GS", respectively, all being manufactured by Sumitomo Chemical Company, Limited. Then, the film was further dipped at 65° C. for five minutes in aqueous solution containing 7.5 wt.% of boric acid and washed for 30 minutes with water of 20° C. The light-polarizing film obtained had neutral gray. FIG. 3 shows the light transmittance of single polarizer and polarizing coefficient thereof in dotted and solid lines, respectively.

EXAMPLE 4

Figure 4:
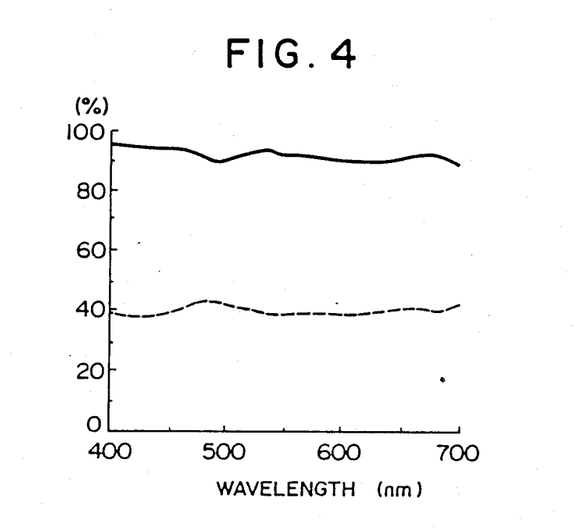

A similar base film to that in Example 1 was dipped at 60° C. for ten minutes, under tension, in aqueous solution containing four dyes defined below and 7.0 wt.% of anhydrous sodium sulfate: 0.08 wt.%, 0.10 wt.%, 0.08 wt.% and 0.15 wt.% of "Direct Fast Yellow GC" of C.I. Direct Yellow 44, "Sumilight Supra Orange GD extra conc" of C.I. Direct Orange 107, "Sumilight Black G conc" of C.I. Direct Black 19 and "Direct Sky Blue 6 B" of C.I. Direct Blue 1, respectively, all being manufactured by Sumitomo Chemical Company, Limited. Then, the film was dipped at 65° C. for five minutes in aqueous solution containing 7.5 wt.% of boric acid and washed for 30 minutes with water of 20° C. The light-polarizing film obtained had neutral gray. FIG. 4 shows a light transmittance of a single polarizer and polarizing coefficient thereof in dotted and solid lines, respectively.

EXAMPLE 5

Figure 5:
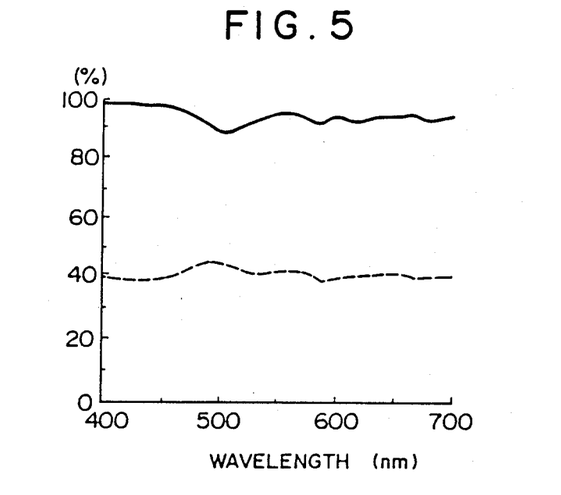

An similar base film to that in Example 1 was dipped at 60° C. for ten minutes, under tension, in aqueous solution containing three dyes defined below and 7.0 wt.% of anhydrous sodium sulfate: 0.06 wt.%, 0.10 wt.% and 2.0 wt.% of "Chrysophenine", "Sumilight Black G conc" and "Sumilight Supra Blue 3 GS", respectively, all being manufactured by Sumitomo Chemical Company, Limited.

Then, the film was dipped at 65° C. for five minutes in aqueous solution of 7.5 wt.% of boric acid and washed for 30 minutes with water of 20° C. The light-polarizing film obtained had neutral gray. FIG. 5 shows the light transmittance of a single polarizer and polarizing coefficient thereof in dotted and solid lines, respectively.

EXAMPLE 6

Figure 6:
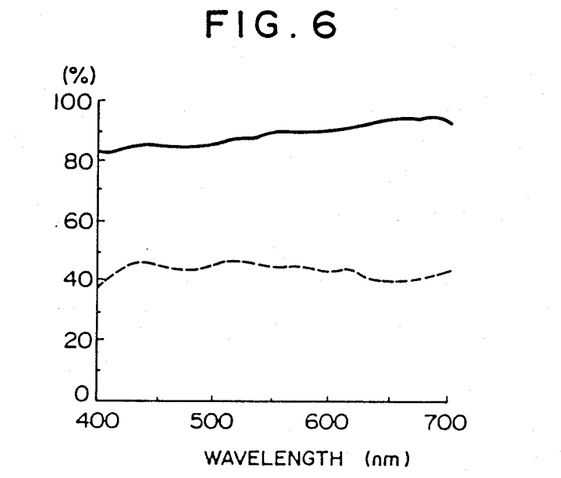

The similar base film to that in Example 1 was dipped at 60° C. for ten minutes, under tension, in aqueous solution containing three dyes defined below and 7.0 wt.% of anhydrous sodium sulfate: 0.04 wt.%, 0.13 wt.% and 0.09 wt.% of "Direct Sky Blue 6 B", "Sumilight Red 4 B" of C.I. Direct Red 81 and "Direct Dark Green BA" of C.I. Direct Green 85", respectively, all being manufactured by Sumitomo Chemical Company, Limited. Then, the film was dipped at 65° C. for five minutes in aqueous solution of 7.5 wt.% of boric acid and washed for 30 minutes with water of 20° C. The light-polarizing film obtained had neutral gray. FIG. 6 shows the light transmittance of a single polarizer and polarizing coefficient thereof in dotted and solid lines, respectively.

EXAMPLE 7

Figure 7:
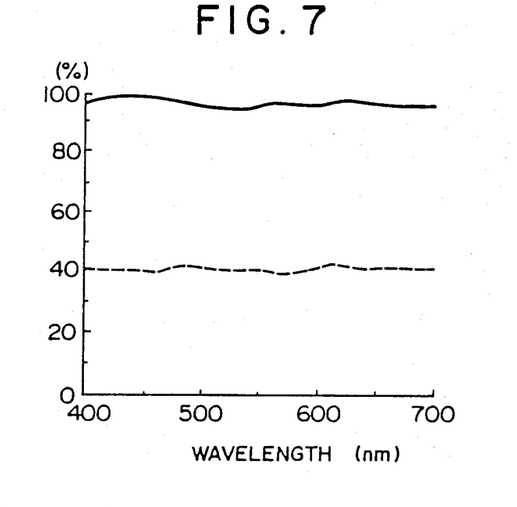

A similar base film to that in Example 1 was dipped at 60° C. for 20 minutes, under tension, in aqueous solution containing six dyes defined below and 7.5 wt.% of anhydrous sodium sulfate: 0.08 wt.%, 0.06 wt.%, 2.0 wt.%, 0.04 wt.%, 0.04 wt.% and 0.04 wt.% of "Japanol Fast Black D conc", "Chrysophenine", "Sumilight Supra Blue 3GS", "Nippon Fast Red BB Conc" of C.I. Direct Red 31, "Nippon Brilliant Violet BK conc" of C.I. Direct Violet 9 and "Benzopurpurine 4 B", respectively, all being manufactured by Sumitomo Chemical Company, Limited. Then, the film was dipped at 65° C. for five minutes in aqueous solution of 7.5 wt.% of boric acid and washed for 30 minutes with water of 20° C. The light-polarizing film obtained had neutral gray. FIG. 7 shows the light transmittance of a single polarizer and polarizing coefficient thereof in dotted and solid lines, respectively.

EXAMPLE 8

Figure 8:
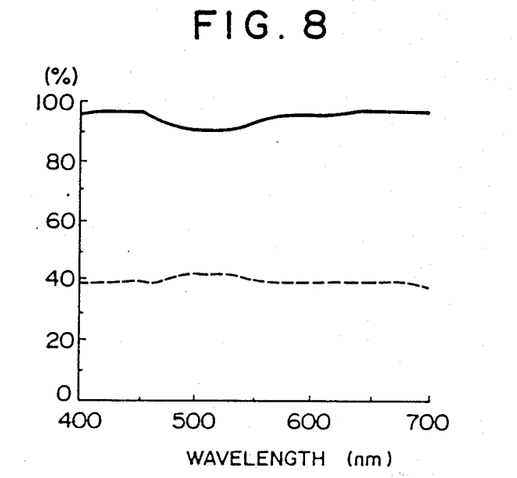

A similar base film to that in Example 1 was dipped at 60° C. for ten minutes, under tension, in a solution containing three dyes defined below and 7.0 wt.% of anhydrous sodium sulfate: 0.04 wt.%, 0.08 wt.% and 2.5 wt.% of "Chrysophenine", "Benzopurpurine 4 B" and "Sumilight Supra Blue 3GS", respectively, all being manufactured by Sumitomo Chemical Company, Limited. Then, the film was further dipped at 65° C. for five minutes in aqueous solution of 7.5 wt.% boric acid and dipped for 30 seconds in water. The light-polarizing film thus obtained had neutral gray. FIG. 8 shows the light transmittance of a single polarizer and polarizing coefficient thereof in dotted and solid lines, respectively.

EXAMPLE 9

Figure 9:
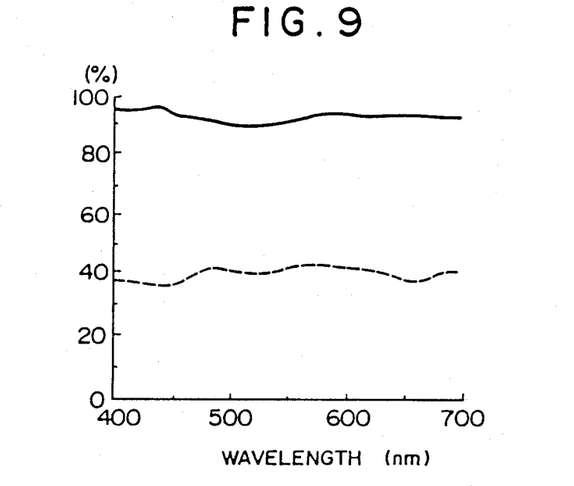

An unstretched polyvinyl alcohol film (Kuraray Vinylon ® 7500) of 75μ thick was dipped at 40° C. for 30 seconds, under tension, in aqueous solution containing three dyes defined below and 0.8 wt.% of anhydrous sodium sulfate: 0.03 wt.%, 0.02 wt.% and 0.09 wt.% of "Japanol Fast Black D conc", "Chrysophenine" and "Sumilite Supra Blue 3 GS", respectively, all being manufactured by Sumitomo Chemical Company, Limited. Then, the film was washed for ten minutes with water of 20° C. The film was uniaxially stretched four times in the longitudinal direction at room temperature. The light-polarizing film obtained had neutral gray. FIG. 9 shows the light transmittance of single polarizer and polarizing coefficient thereof in dotted and solid lines, respectively.

EXAMPLE 10

Figure 10:
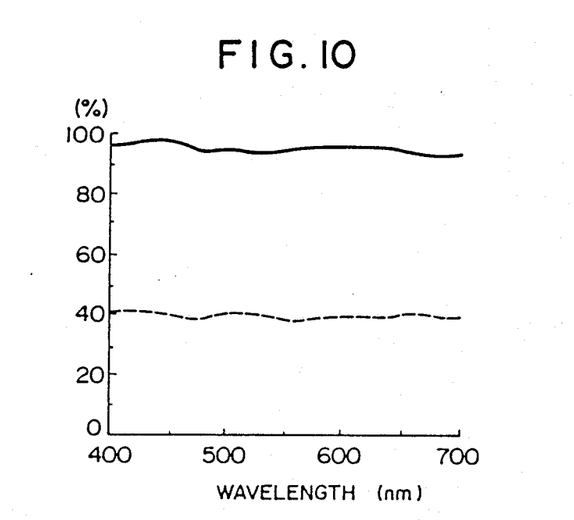

An unstretched polyvinyl alcohol film (Kuraray Vinylon ® 7500) of 75μ thick was dipped at 40° C. for 30 seconds, under tension, in aqueous solution containing four dyes defined below and 0.8 wt.% of anhydrous sodium sulfate: 0.02 wt.%, 0.04 wt.%, 0.03 wt.% and 0.09 wt.% of "Chrysophenine", "Direct Fast Orange S", "Japanol Fast Black D conc" and "Sumilite Supra Blue 3 GS", respectively, all being manufactured by Sumitomo Chemical Company, Limited. Then, the film was uniaxially stretched four times in the longitudinal direction. Then, the film was dipped at 50° C. for five minutes in aqueous solution of 7.5 wt.% of boric acid, and washed for 30 minutes with water of 20° C. The light-polarizing film obtained had neutral gray. FIG. 10 shows the light transmittance of a single polarizer and polarizing coefficient thereof in dotted and solid lines, respectively.

EXAMPLE 11

Cellulose triacetate film commercially available and manufactured by Fuji Photo Film corporation of 80μ thick was coated on both sides of the light-polarizing films prepared by Examples 1-10, respectively, by use of urethane adhesive.

Initial polarization qualities of light-polarizing plates obtained were observed. Polarization qualities of the light-polarizing plates were again observed after they had been left to stand for 500 hours in a thermo-hygrostat held at 85° C. and under 90% RH. There were no change in polarization qualities from the initial ones.

EXAMPLE 12

The same light-polarizing plates as in Example 11 were left to stand for 200 hours in a hot air oven held at 100° C., after initial polarization qualities had been observed. There were no change in polarization qualities from the initial ones.

COMPARISON EXAMPLE 1

Figure 11:
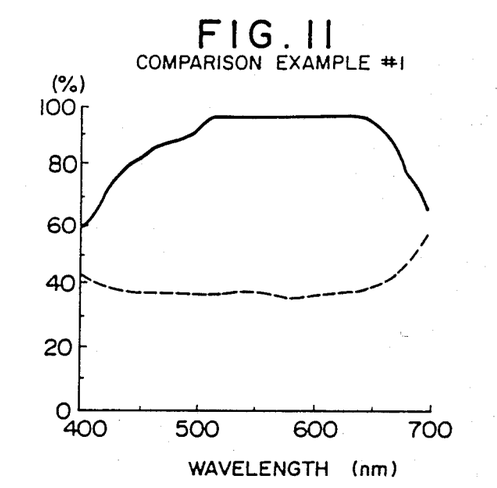
FIGS. 11–12 show the similar relationship to the above with respect to light-polarizing films obtained in Comparison examples 1–2.

A similar base film to that in Example 1 was dipped at 50° C. for 40 minutes, under tension, in aqueous solution containing 0.03 wt.% of only one dye of "Japanol Fast Black D conc" and 0.3 wt.% of anhydrous sodium sulfate, said dye being manufactured by Sumitomo Chemical Company, Limited. Then, the film was washed for 30 minutes with water of 20° C. FIG. 11 shows the light transmittance of a single polarizer and polarizing coefficient of a light-polarizing film obtained, in dotted and solid lines, respectively. The light-polarizing film had no neutral gray and inferior light polarization quality.

COMPARISON EXAMPLE 2

Figure 12:
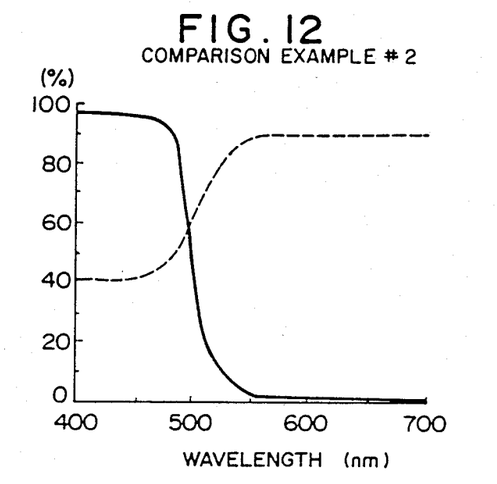

A similar base film to that in Example 1 was dipped at 50° C. for 40 minutes, under tension, in aqueous solution containing 0.03 wt.% of only one dye of "Chrysophenine" and 0.3 wt.% of anhydrous sodium sulfate, said dye being manufactured by Sumitomo Chemical Company, Limited. Then, the film was washed for 30 minutes with water of 20° C. FIG. 12 shows the light transmittance of a single polarizer and polarizing coefficient of a light-polarizing film obtained, in dotted and solid lines, respectively. The film had no neutral gray and inferior light polarization quality.

We claim:

1. A highly durable, dye light-polarizing film having neutral gray as well as a high polarizing coefficient, which comprises a polymer film made from polyvinyl alcohol or derivatives thereof having at least three dichroism dyes adsorbed and oriented therein, which is treated with an aqueous boric acid solution under the conditions wherein the concentration of boric acid is 5-10%, and the temperature is 50°-80° C., said light-polarizing-film having, over a visible light region of 400-700 nm, a minumum polarizing coefficient of at least 70%, the difference between the minimum and a maximum polarizing coefficient is at most 20%, a minimum light transmittance of at least 20%, and the difference between the minimum and a maximum light transmittance is at most 20%;

wherein the dichroism dyes are selected from the following respective classes of:

(A) a yellow dichroism dye having a major absorption wavelength region in the range of 400-500 nm,
(B) a black dichroism dye having a major absorption wavelength region in the range of 450-650 nm,
(C) a blue dichroism dye having a major absorption wavelength region in the range of 570-700 nm,
(D) an arange or red dichroism dye having a major absorption wavelength region in the range of 450-570 nm; and
(E) a green dichroism dye having a major absorption wavelength region in the range of 600-700 nm or 400-450 nm.

2. Highly durable, dye light-polarizing film according to claim 1, wherein the dichroism dyes comprise at least one each from the following respective classes A-C:

A:
C.I. Direct Yellow 12
C.I. Direct Yellow 44
B:
C.I. Direct Black 17
C.I. Direct Black 19
C:
C.I. Direct Blue 202
C.I. Direct Blue 1.

3. Highly durable, dye light-polarizing film according to claim 1, wherein the dichroism dyes comprise at least one each from the following respective classes A-D:

A:
C.I. Direct Yellow 12
C.I. Direct Yellow 44
B:
C.I. Direct Black 17
C.I. Direct Black 19
C:
C.I. Direct Blue 202
C.I. Direct Blue 1
D:
C.I. Direct Orange 26
C.I. Direct Orange 107
C.I. Direct Red 31
C.I. Direct Red 81
C.I. Direct Red 2.

4. Highly durable, dye light-polarizing film according to claim 1, wherein the dichroism dyes comprise at least one each from the following respective classes A, C and D:

A:
C.I. Direct Yellow 12
C.I. Direct Yellow 44
C:
C.I. Direct Blue 202
C.I. Direct Blue 1
D:
C.I. Direct Orange 26
C.I. Direct Orange 107
C.I. Direct Red 31
C.I. Direct Red 81
C.I. Direct Red 2.

5. Highly durable, dye light-polarizing film according to claim 1, wherein the dichroism dyes comprise at least one each from the following respective classes C-E:

C:
C.I. Direct Blue 202
C.I. Direct Blue 1
D:
C.I. Direct Orange 26
C.I. Direct Orange 107
C.I. Direct Red 31
C.I. Direct Red 81
C.I. Direct Red 2
E:
C.I. Direct Green 85.

6. Highly durable, dye light-polarizing film according to claim 1, wherein the polymer film is made from polyvinyl alcohol or derivatives thereof and has been uniaxially press-stretched under at least one pair of pressure rolls held at a temperature of 55°-130° C.

7. A highly durable, light-polarizing film as in claim 1, having at least four dicroism dyes.

* * * * *